Feb. 17, 1931.  V. G. APPLE  1,792,524
DYNAMO ELECTRIC MACHINE ARMATURE
Filed Nov. 23, 1927  2 Sheets-Sheet 1
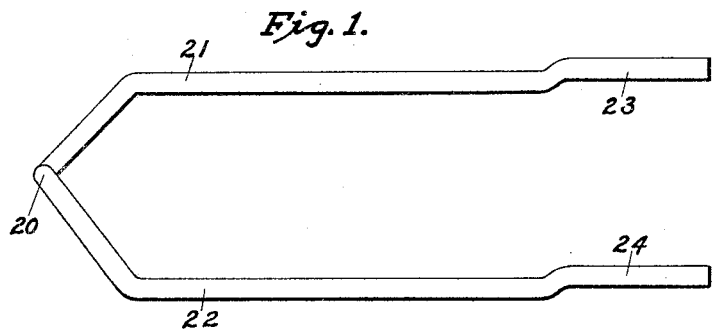
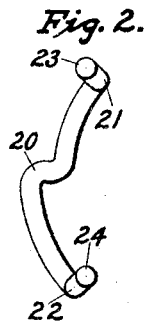
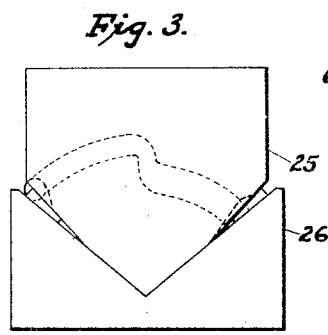
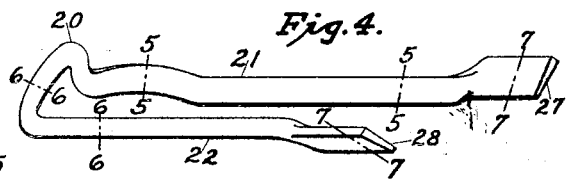
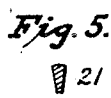
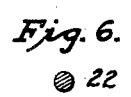
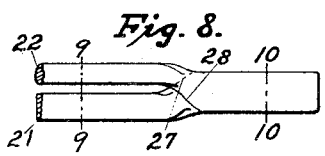
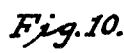
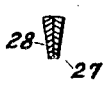
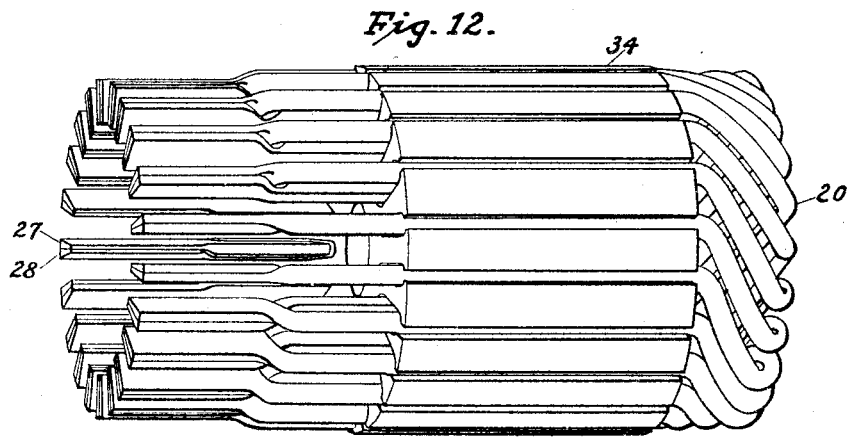
INVENTOR
Vincent G. Apple Feb. 17, 1931.   V. G. APPLE   1,792,524
DYNAMO ELECTRIC MACHINE ARMATURE
Filed Nov. 23, 1927   2 Sheets-Sheet 2
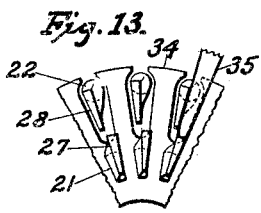
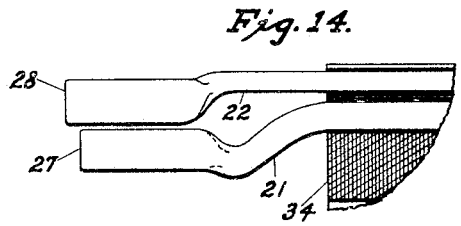
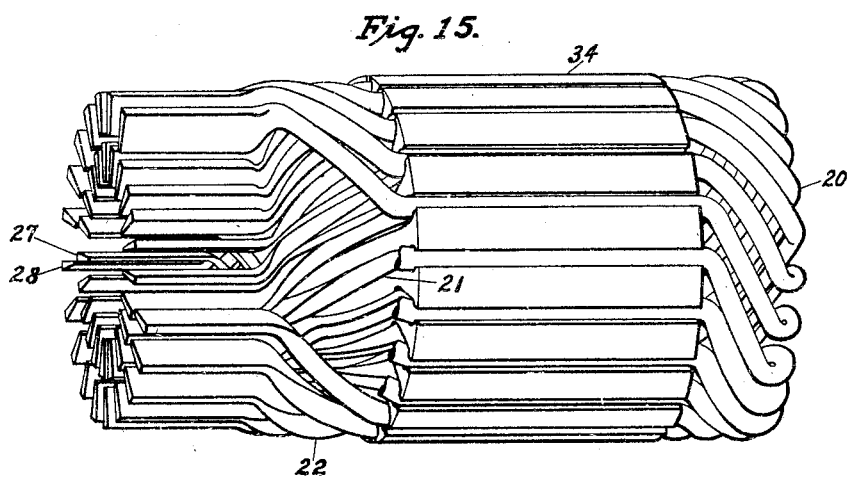
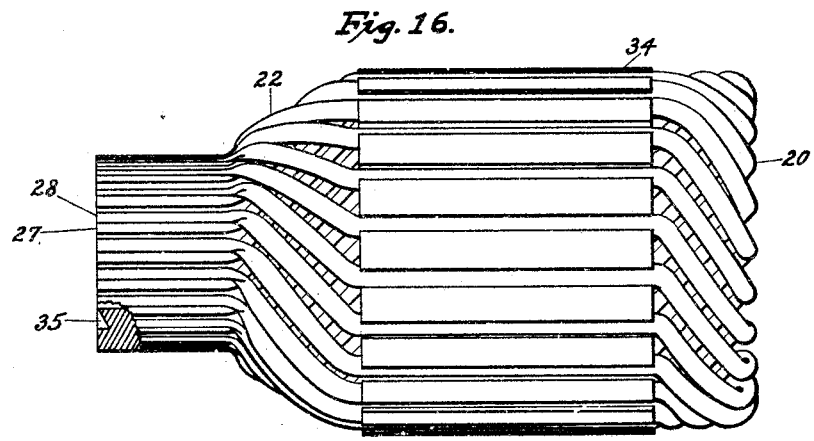
INVENTOR Patented Feb. 17, 1931

1,792,524

UNITED STATES PATENT OFFICE

VINCENT G. APPLE, OF DAYTON, OHIO

DYNAMO-ELECTRIC-MACHINE ARMATURE

Application filed November 23, 1927. Serial No. 235,280.

My invention relates to single turn bar wound armatures and is particularly adaptable to endwise entry of the winding.

One of the objects of my invention is to provide an integral winding unit comprising a loop having its open ends adapted to compose commutator segments.

Another object of my invention is to provide an armature having a maximum of its core and winding material effectively employed, by producing core apertures of the most effective contour and forming commercially procurable material without waste into conductors that will conform to the contour of the core apertures selected and be readily assembled therein.

Further objects will be apparent to those skilled in the art upon consideration of the description and drawings wherein—

Fig. 1 is a plan view of a loop bent from round wire representing a turn of the winding.

Fig. 2 is an end view of Fig. 1.

Fig. 3 represents a die by means of which the round cross section of the loop is changed to different cross sections at parts of its length.

Fig. 4 shows the loop after it has been pressed in the die Fig. 3.

Fig. 5 is a cross section taken on lines 5—5 of Fig. 4.

Fig. 6 is a cross section taken on lines 6—6 of Fig. 4.

Fig. 7 is a cross section taken on lines 7—7 of Fig. 4.

Fig. 8 shows how a leg of the outer layer may be paired with a leg of the inner layer of the winding to form a composite wedge shaped section.

Fig. 9 is a cross section taken on the line 9—9 of Fig. 8.

Fig. 10 is a cross section taken on the line 10—10 of Fig. 8.

Fig. 11 shows a type of core aperture to which loops Fig. 4 are particularly applicable.

Fig. 12 shows a core with its apertures completely filled with loops Fig. 4.

Fig. 13 shows how the terminals of the entire inner layer of the winding may be displaced radially inward.

Fig. 14 shows one pair of terminals after the terminal of the inner layer has been displaced radially inward.

Fig. 15 shows how the terminals are circumferentially displaced, the outer layer in one direction and the inner layer in the other direction.

Fig. 16 shows an armature after the outer layer of terminals has been displaced radially inward and the terminals brought together to compose a commutator.

Fig. 1 is a plan view and Fig. 2 an end view illustrating steps in the method of making a loop, wherein a predetermined length of round wire has been cut off and bent to loop formation, as at 20, having extending therefrom a leg 21 which will later become part of the inner layer of the winding and which may therefore be called an inner conductor leg and a leg 22 which will later become a part of the outer layer of the winding and which may therefore be called an outer conductor leg. The ends 23 and 24 are bent slightly out of alignment with the remaining portions of the legs, the amount and direction of the bends being such that those ends will be equally distant from the armature axis and will extend parallel therewith.

After the loop has been formed, as in Figs. 1 and 2, it is placed in a die, as in Fig. 3. The die here shown is for illustrative purposes only and consists of an upper portion 25 and a lower portion 26 between which the loop is pressed to change the cross sectional contour of parts of its length, and to bring the loop to the form shown in Fig. 4, wherein the cross section of the leg 21 has been changed from round to the form shown in Fig. 5, the other leg 22 having been left round as in Fig. 6 and the offset terminals 23 and 24 flattened to the shape shown in Fig. 7. By having offset the terminals, as at 23 and 24, Fig. 1, the flattened ends 27 and 28 will occupy positions of equal distance from the core axis while the parts 21 and 22 will be at different distances therefrom, so that when a leg 21 of one loop is paired with a leg 22 of another loop they will arrange themselves substantially as shown in Fig. 8 wherein legs 21 and 22, relatively to their final position in the core, are radially one above the other, as in Fig. 9, and the flattened ends 27 and 28 are circumferentially adjacent, as in Fig. 10. This arrangement of pairs of the contour shown is particularly adaptable to endwise entry into core apertures of the type shown at 31, Fig. 11, and an entire winding composed of loops so constructed may be assembled with their ends slightly entered into the apertures of a core and simultaneously pushed into place, as more clearly described in my Patent Number 1,555,931.

The core apertures may be lined with insulators, as at 32, and a partitioning rib, as at 33, may be placed between the two legs of a pair, or the insulation may be applied to the legs of the loop before entry into a core.

After the entire winding has been assembled and pushed into place in a core 34, as shown in Fig. 12, provision must be made to rearrange the pairs of terminal ends 27—28 into other pairs, and to do this the entire set of inner layer terminals 27 is radially displaced in a manner similar to the several terminals shown in the end view, Fig. 13. The displacing of these terminals may be accomplished singly with a plunger, as at 35, or a tool may be constructed having a plurality of plungers to displace all terminals of the layer simultaneously.

A part section Fig. 14 shows the pair of terminals of an aperture after the inner layer terminal has been radially displaced, and while I here show the inner layer of terminals as having been displaced radially inward leaving the outer layer in normal position, it is obvious that as an alternative the outer layer may be displaced radially outward leaving the inner layer in normal position or both layers may be displaced, the one inwardly and the other outwardly, the object being to separate the circumferentially adjacent flattened ends into cylindrical layers in order that the ends of one layer will not interfere with the ends of the other layer when circumferential displacement of the ends of one layer relative to the ends of the other layer is taking place.

When the entire set of inner layer terminals has been radially displaced in a manner indicated in Figs. 13 and 14, all of the terminals are simultaneously moved, the outer layer circumferentially in one direction and the inner layer circumferentially in the other direction, an amount corresponding to the front pitch of the winding leaving the terminal ends 27 and 28 extending parallel to the core axis. An armature with the winding so bent is shown in Fig. 15, several outer layer bars being broken away for clearness, and while I show the layers as being bent equal amounts, they may be bent the one layer more than the other, or both layers may be bent different amounts in the same direction as long as the algebraic sum of the bends equals the front pitch desired.

In order to pair the terminal ends 27 and 28 to form commutator segments the terminals 28 of the outer layer are now radially displaced, by a method similar to that employed in Fig. 13 to displace the inner layer, and thus the terminals 27 and 28 are again brought circumferentially adjacent in rearranged pairs, as shown in Fig. 16, where both outer layer terminals 28 and inner layer terminals 27 are circumferentially adjacent in cylindrical formation of relatively small diameter. The terminals however, may be arranged in a circle of larger diameter by leaving more space between pairs or by adding a metal pad to each pair.

When the steps of the method of making an armature have progressed to the stage shown in Fig. 16 some form of binding means must be applied to hold the parts of the commutator together, the terminals comprising pairs in electrical contact, and the whole securely held against centrifugal force, and since in my co-pending application Serial Number 234,158, filed Nov. 18, 1927, I describe a process suitable for binding these ends the same will not be herein repeated, as the methods therein disclosed may be applied equally well to the present invention. A notch, as at 35, or other projection which the binding means may engage, may be cut in the terminal ends either separately or after they are assembled as shown, or suitable projections may be formed on the terminal ends in the die Fig. 3.

A single turn bar winding is usually arranged in two concentric layers so that the portions of the bars which project beyond the ends of the core may extend, the one layer helically right handed and the other layer helically left handed, and by such an arrangement a bar of one layer may join a widely separated bar of another layer thru their helically projecting ends without interference or contact with the helical ends of other bars of the winding. It is therefore obvious that the conductors of such a winding need be arranged in two concentric layers only at such portions of their length as are helically disposed, and that all other portions of the winding may be composed of circumferentially adjacent parts in a single cylindrical layer.

While I have shown and described a winding wherein the two layer configuration Fig. 9 extends not only thruout the helically disposed parts but also thruout the portions contained in the core apertures, it is apparent that in the process of making the loop these aperture portions may be brought to positions radially equal to each as are the parts 23 and 24, Fig. 1, after which the die, Fig. 3, may flatten these aperture portions to the cross sectional contour of the terminal ends, Fig. 7. Such a winding would comprise helical portions in two concentric layers and aperture and terminal end portions composed of parts circumferentially adjacent in a single cylindrical layer. As it is sometimes considered advantageous to have wide thin conductors circumferentially adjacent in a core aperture rather than thicker narrower conductors radially one above the other, the loops may be so made when the advantages to be gained justify.

While I have shown and described my method of making an improved winding as consisting of a number of steps in a given sequence, it is obvious that the steps need not necessarily be taken in the exact sequence indicated, but may be reversed or rearranged, or steps described as separately taken may be combined if so desired, and while I have shown round as a preferred form of wire for making loops comprising a winding, I do not wish to limit myself to the use of round wire, as wire of a modified form may be used, one feature of the invention consisting in providing a loop by using wire of uniform cross sectional contour thruout its length to form the conductors, and altering the cross sectional contour at parts of the length of the conductors, in such manner that those portions of the conductors which are necessarily arranged one radially above the other have cross sections adapted to that purpose while other portions which preferably occupy circumferentially adjacent positions are also suitably shaped, without altering the current carrying capacity at any point in the loop, yet maintaining such cross sectional contours at the altered portions that the composite contour of a pair of conductor legs thruout the length of a pair may substantially conform to the shape of a winding aperture so as to be endwise enterable therethru.

Variations in detail within the spirit of the invention I am to embrace in the following claims, therefore I claim—

1. In an armature winding, integral winding loops each comprising a conductor bar of the outer layer and a conductor bar of the inner layer joined at one end and commutator lugs formed on the free ends of said bars, the cross sectional area of a bar and its lug being substantially the same but the cross sectional contour being different, a bar of the outer layer paired with a bar of the inner layer forming a composite contour which substantially fits a winding aperture, the bar portions being one radially above the other and the lug portions being circumferentially adjacent, all being in a straight line so that pairs so arranged may be endwise entered thru said winding apertures.

2. In a two layer bar wound armature, a plurality of integral winding loops each comprising two axially parallel circumferentially spaced apart bars joined at one end by integral back leads which position one bar closer to the axis than the other bar, and two axially parallel circumferentially spaced apart commutator sections joined to said bars by integral front leads which position said sections radially equidistant from the core axis, a loop being of substantially uniform cross sectional area thruout its length but the commutator sections being of substantially half the circumferential thickness and double the radial width of the bars.

3. In an armature, a two layer bar winding comprising a plurality of winding loops closed at one end and open at the other, each loop integrally comprising two parallel angularly spaced apart conductor portions one in the outer layer and the other in the inner layer joined together by the closed end of the loop, the open ends being located in different angularly spaced apart positions from the bars, and being substantially half their circumferential thickness and twice their radial width, said ends being bound together in circumferentially adjacent pairs to compose a commutator.

4. In an armature, a two layer bar winding comprising a plurality of winding loops closed at one end and open at the other, each loop integrally comprising two parallel angularly spaced apart conductor portions one in the outer layer and the other in the inner layer and joined together by the closed end of the loop, the open ends being located in different angularly spaced apart positions closer to the armature axis than either of said conductor portions, said ends being of substantially half the circumferential thickness and twice the radial width of said conductor portions and bound together in circumferentially adjacent pairs to compose a commutator.

In testimony whereof I hereunto subscribe my name.

VINCENT G. APPLE.